(12) United States Patent   (10) Patent No.: US 9,105,290 B2
Min et al.                  (45) Date of Patent:   Aug. 11, 2015

(54) DISCONTINUOUS CHARGE/DISCHARGE POWER SOURCE FOR RETRACT APPLICATION

(71) Applicant: Seagate Technology LLC, Cupertino, CA (US)

(72) Inventors: Shuang Quan Min, Singapore (SG); June Christian Ang, Singapore (SG); Tze Ming Jimmy Pang, Singapore (SG); Kian Keong Ooi, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 37 days.

(21) Appl. No.: 14/103,396

(22) Filed: Dec. 11, 2013

(65) Prior Publication Data

US 2015/0162035 A1  Jun. 11, 2015

(51) Int. Cl.
*G11B 21/02* (2006.01)
*G11B 5/55* (2006.01)

(52) U.S. Cl.
CPC .............. *G11B 5/5565* (2013.01); *G11B 5/553* (2013.01)

(58) Field of Classification Search
CPC .. G11B 5/6005; G11B 5/59633; G11B 5/521; G11B 5/5547; G11B 15/43; G11B 15/48; E05Y 2900/55; B60L 7/12; H02P 3/12
USPC ........... 360/71, 75, 78.04; 318/289, 377, 368, 318/362
See application file for complete search history.

(56) References Cited

U.S. PATENT DOCUMENTS

| 5,504,402 | A  | * | 4/1996  | Menegoli       | 318/377 |
|-----------|----|---|---------|----------------|---------|
| 6,140,784 | A  | * | 10/2000 | Mazda          | 318/280 |
| 6,177,772 | B1 | * | 1/2001  | Barua et al.   | 318/362 |
| 7,054,091 | B2 |   | 5/2006  | Swize          |         |
| 7,068,460 | B2 | * | 6/2006  | Brenden et al. | 360/75  |
| 7,421,359 | B2 |   | 9/2008  | Harmer et al.  |         |
| 7,633,702 | B1 |   | 12/2009 | Heimbaugh      |         |
| 7,902,778 | B2 |   | 3/2011  | Yamashita et al. |       |
| 8,134,318 | B2 |   | 3/2012  | Ayala, II et al. |       |
| 8,228,629 | B2 | * | 7/2012  | Yamashita et al. | 360/71 |
| 2002/0141102 | A1 |   | 10/2002 | Kusumoto      |         |
| 2004/0080858 | A1 | * | 4/2004  | Suzuki         | 360/75  |
| 2007/0285828 | A1 | * | 12/2007 | Yamashita et al. | 360/75 |
| 2009/0128946 | A1 |   | 5/2009  | Ooi et al.    |         |
| 2010/0315738 | A1 | * | 12/2010 | Yamashita et al. | 360/71 |
| 2012/0151162 | A1 |   | 6/2012  | Trantham et al. |       |

OTHER PUBLICATIONS

HGST, a Western Digital Company, Whitepaper entitled, "Ramp Load/Unload Technology in Hard Disk Drives" Nov. 2007, 7 pages.

* cited by examiner

*Primary Examiner* — Nabil Hindi
(74) *Attorney, Agent, or Firm* — HolzerIPLaw, PC

(57) ABSTRACT

In accordance with one embodiment of the described technology, a retract controller capacitor is charged using a back electromagnetic force voltage to produce a backup power source voltage, the retract controller capacitor is discharged to power a retract controller circuit, and an actuator arm of a storage drive is driven toward a desired location concurrently with the discharging operation.

20 Claims, 6 Drawing Sheets

DISCONTINUOUS CHARGE/DISCHARGE POWER SOURCE FOR RETRACT APPLICATION

SUMMARY

Embodiments described and claimed herein address a methodology and system to provide backup power to retract an actuator following a loss of supply power. In accordance with one embodiment, a retract controller capacitor is charged using a back electromagnetic force voltage to produce a backup power source voltage, the retract controller capacitor is discharged to power a retract controller circuit, and an actuator arm of a storage drive is driven toward a desired location concurrently with the discharging operation. Other embodiments are also described and recited herein.

DETAILED DESCRIPTION

Figure 1:
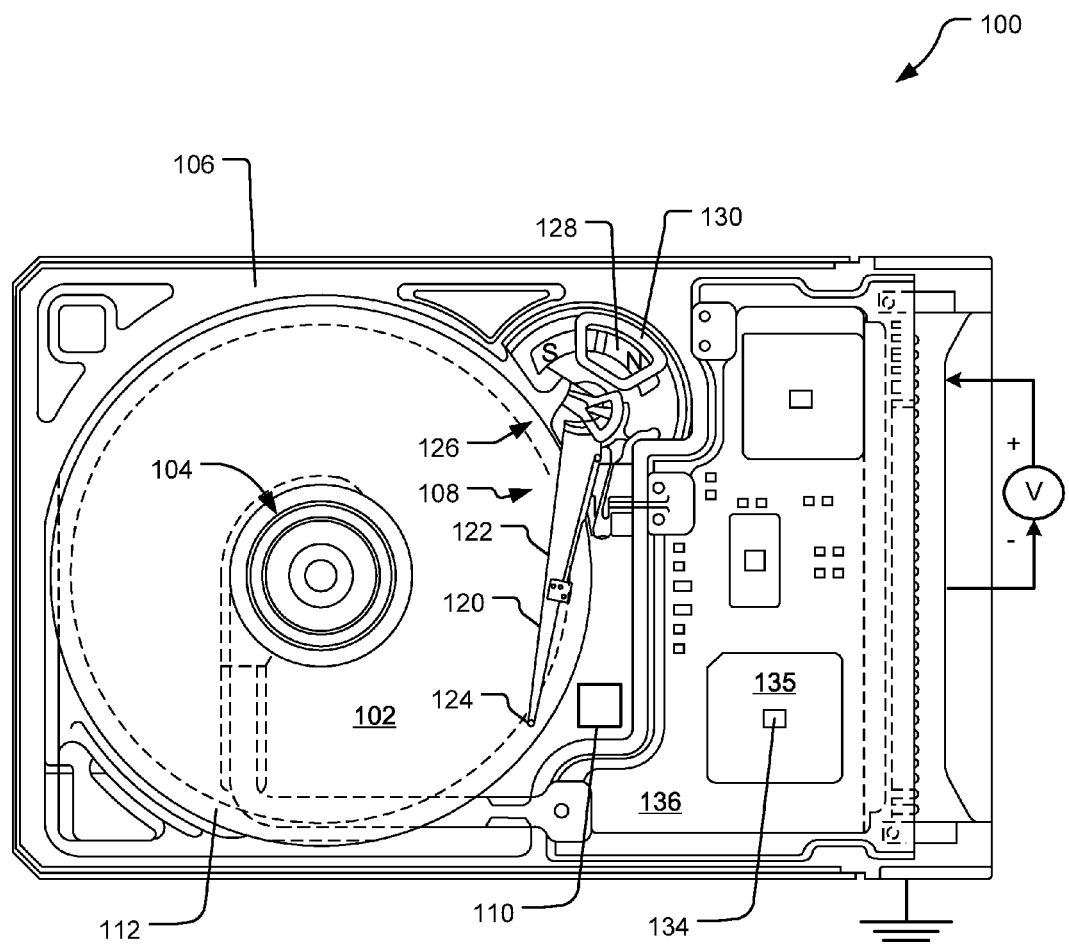
FIG. 1 illustrates example retract controller circuitry in a data storage drive.

In hard disk drive technology, retract design functionality is critical after a supply power loss. Sufficient energy is required to move one or more read/write heads of an actuator away from media to a parking ramp (or a designated landing zone). If a head does not successfully reach a parking ramp, and alternatively makes contact with an area on a disc surface that contains data, some of the data in the contact area may be lost.

The disclosed technology describes a stage of retract (Discontinuous Constant Velocity Retract (DCVR)) responsible to bring an actuator from media to a parking ramp. In other embodiments, there may also be a second stage of retract (e.g., Constant Voltage Retract) to provide a constant push to the actuator to guarantee a successful parking event. Servo firmware can program the duration and velocity/voltage target for either of these stages.

The described embodiments respond to a loss of supply power by dedicating the available back electromagnetic force (BEMF) voltage $V_{BEMF}$ for addressing the mechanical load requirements of driving the head(s) from the data tracks to the parking zone, and addressing the electrical load requirements to power the electronics components (analog and digital) of the retract controller circuitry.

The disclosed technology utilizes a discontinuous boost regulator, as well as new retract architecture and methods, to meet the retract requirements. More specifically, the disclosed technology maximizes available current to a storage device (e.g., a capacitor) during a tri-state and uses the stored energy with the storage device during a driving state.

Retract controller circuitry can positionally control the velocity of the actuator during the retract cycle by a DCV retract controller. Current is driven by a constant switching frequency control, which separates the stage into a driving state ($T_{ON}$) and a tri-state ($T_{OFF}$). The driver is turned on to drive the actuator during the driving state, and off to enter the float (tri-state) mode in which the BEMF of a coil can be measured for the velocity calculation. A retract controller circuit uses a small capacitor to maintain a backup power source voltage $V_B$ to a target voltage $V_T$ to power the retract controller circuitry.

The retract controller circuitry defines parameters for a retract cycle on the basis of input variables such as starting track location, environmental conditions, and the like. Parameterization of such things as retract voltage, simultaneous braking, time durations, and duty cycle for DCV, are performed by the retract controller circuitry to optimize the retract cycle by ensuring that a head is parked within a time interval when a $V_B$ is greater than a $V_T$. The retract controller capacitor will be charged at any time in a tri-state if the $V_B$ is lower than the $V_T$.

In some embodiments, the capacitor size used herein is fairly small (e.g., 1 uF) due to the short duty cycle of a VCM driving state and a tri-state and may be less than 1 mS in some implementations.

FIG. 1 depicts a data storage device 100 for retracting an actuator after a loss of supply power. The data storage device 100 includes one or more magnetic recording discs (e.g., disc 102) that are mounted to a rotatable hub of a spindle motor 104 and rotated at a high speed. The data storage device 100 typically includes a plurality of discs and, therefore, a plurality of corresponding heads mounted to flexure arms for the top and bottom of each disc surface. However, it is also possible for the data storage device 100 to have just the single disc 102.

The spindle motor 104 is mounted to a base plate 106. An actuator 108 is coupled to the base plate 106. The data storage device 100 also includes a cover plate (not shown) that is coupled to the base plate 106 and encloses the disc 102 and actuator 108. The actuator 108 includes a flexure arm 120 attached to an actuator arm 122. A head 124 is attached to the end of the flexure arm 120. The head 124 is constructed to magnetize the disc 102 in writing data and to sense the magnetic field symbolizing data stored on the disc 102 in reading data. The actuator 108 pivots about a bearing assembly 126 that is mounted to the base plate 106.

A magnet 128 is located near an end of the actuator 108 and an electrical coil 130 is attached to the actuator 108. The arrangement of the magnet 128 and coil 130 is commonly referred to as a voice coil motor (VCM). The spindle motor 104, the head 124 and the VCM are coupled to a number of electronic circuits (e.g., electronic circuit 134) mounted to a printed circuit board 136. Although not specifically depicted, the electronic circuits may include a read channel chip, a microprocessor-based controller, a random access memory (RAM) device, a voice coil motor driver, and a spindle motor driver, for example. The printed circuit board 136 also includes a retract controller circuitry 135 for controlling a retract cycle on the actuator 108 in accordance with the described technology following a loss of supply power to the data storage device 100.

The flexure arm 120 is manufactured to have a bias such that if the disc 102 is not spinning, and aerodynamic forces are not pushing upward on the head(s), a head 124 will come into contact with the disc surface. When the disc 102 is spinning, the head 124 typically moves in close proximity to (above or below depending on position in a stack) the respective disc surface; the spatial separation therebetween called the "fly height." The fly height is maintained by an air bearing that is created by the spinning of the disc surface such that a boundary layer of air is compressed between the spinning disc surface and the head 124. The bias on the flexure arm 120 forces the head 124 closer to the disc surface, while the air bearing forces the head 124 away from the disc surface. Thus, the bias on the flexure arm 120 and air bearing act together to maintain the desired fly height when the disc 102 is spinning.

The head 124 is selectively moved close to the surface of the disc 102 in a data transfer relationship therebetween. The head 124 is radially positioned by the actuator 108, as positionally guided by a servo control system.

It will be understood that if the disc 102 is not spinning at a high enough rotational speed such as revolutions per minute (RPM), the air bearing produced under the head 124 may not provide enough force to prevent the flexure arm 120 bias from forcing the head 124 to contact the disc surface. If the head 124 physically contacts an area on the disc surface that contains data, some of the data in the contact area may be lost. To avoid this, the actuator 108 is routinely positioned such that the head 124 does not contact a data-containing area (a data track) of the disc 102 when the disc 102 is not spinning, or when the disc 102 is not spinning at a high enough RPM to maintain an air bearing.

In a load/unload (L/UL) drive, the actuator 108 includes a tab (not shown) on the end of the flexure arm 120 near the head 124 that contacts a ramp 110. The tab located at the end of the flexure arm 120 contacts an inclined surface of the ramp 110 as the actuator 108 is moved to a parked position. Parking the actuator 108 on the ramp 110 keeps the head 124 from inadvertently contacting the disc surface. The use of the ramp 110 may also make more of the disc surface available for storing customer data, as opposed to a contact start stop (CSS) drive, which incorporates the landing zone 112 into a portion of the disc surface itself that might otherwise be used for more data tracks.

In the CSS drive, the actuator 108 is positioned such that the head 124 is parked in a designated landing zone 112 of the disc 102. The landing zone 112 is an annular area on the disc 102 surface that does not contain customer data and is designed to facilitate contact between the head 124 and the disc surface. For example, the landing zone 112 can be a textured area on the disc 102 to reduce the stictional engagement between the head and the disc surface, thus reducing stiction problems when the disc 102 begins to spin. The disclosed technology may apply to one or both of L/UL and CSS drives.

In a normal shut down operation, the electronic circuit 134 operates to position the actuator 108 such that the head 124 does not contact the data containing portion of the disc surface when the disc 102 slows and eventually stops spinning. However, in certain situations the data storage device 100 may lose unexpectedly supply power while the head 124 is flying over data tracks of the disc 102. Such situations may, for example, stem from a loss of power to the computer system containing the data storage device 100, a power supply malfunction within the computer or data storage device 100, or an inadvertent disconnect of the power to the data storage device 100 prior to it being shut down.

Loss of supply power to the data storage device 100 may be detected by using a supply power monitor circuit located within the electronic circuit 134. This supply power monitor includes an undervoltage detector (see 202 and 302 in FIGS. 2 and 3, respectively), which monitors the supply power to the data storage device 100. If the supply power to the data storage device 100 drops below a specified level, the undervoltage detector resets the electronics within the drive, and informs the retract controller circuitry 135 to initiate a retract cycle to move the actuator 108 to the parking zone 112 or ramp 110. Once the retract cycle is complete, a brake cycle can be initiated to slow the spinning disc 102. This braking can be achieved by shorting the windings of the spindle motor 104.

The retract controller circuitry 135 may be contained within the electronic circuit 134 and powered in accordance with the present embodiments. When the retract cycle is initiated, the retract controller circuitry 135 is electrically connected to the windings of the spindle motor 104. If the motor 104 is spinning at a high enough RPM, the voltage induced to the windings ($V_{BEMF}$) can be used to meet the mechanical load of retracting the actuator 108, or to meet the electrical load of operating the electronics circuit 134 at least to the extent necessary to operate the retract controller circuitry 135 to perform the retract cycle.

In the event that supply power is lost, the momentum of the disc(s) keeps them rotating in a wind-down state until bearing frictional resistance and/or braking brings the disc(s) to rest. During that wind-down rotation the permanent magnetic field induces a BEMF in the rotating coils of the spindle motor 104. The retraction circuitry 135 is responsive to an indication that the supply power has been interrupted to control how the $V_{BEMF}$ is utilized. That is, under certain conditions the retract controller circuitry 135 dedicates the $V_{BEMF}$ to powering only the mechanical load of retracting the actuator to the parking zone 112 or ramp 110. In other implementations, the refraction backup circuitry may provide at least a portion of the $V_{BEMF}$ to serve a dual purpose of powering that mechanical load as well as powering the electronics load of the data storage device during the actuator retraction and/or charging an energy storage device (e.g., a capacitor).

Figure 2:
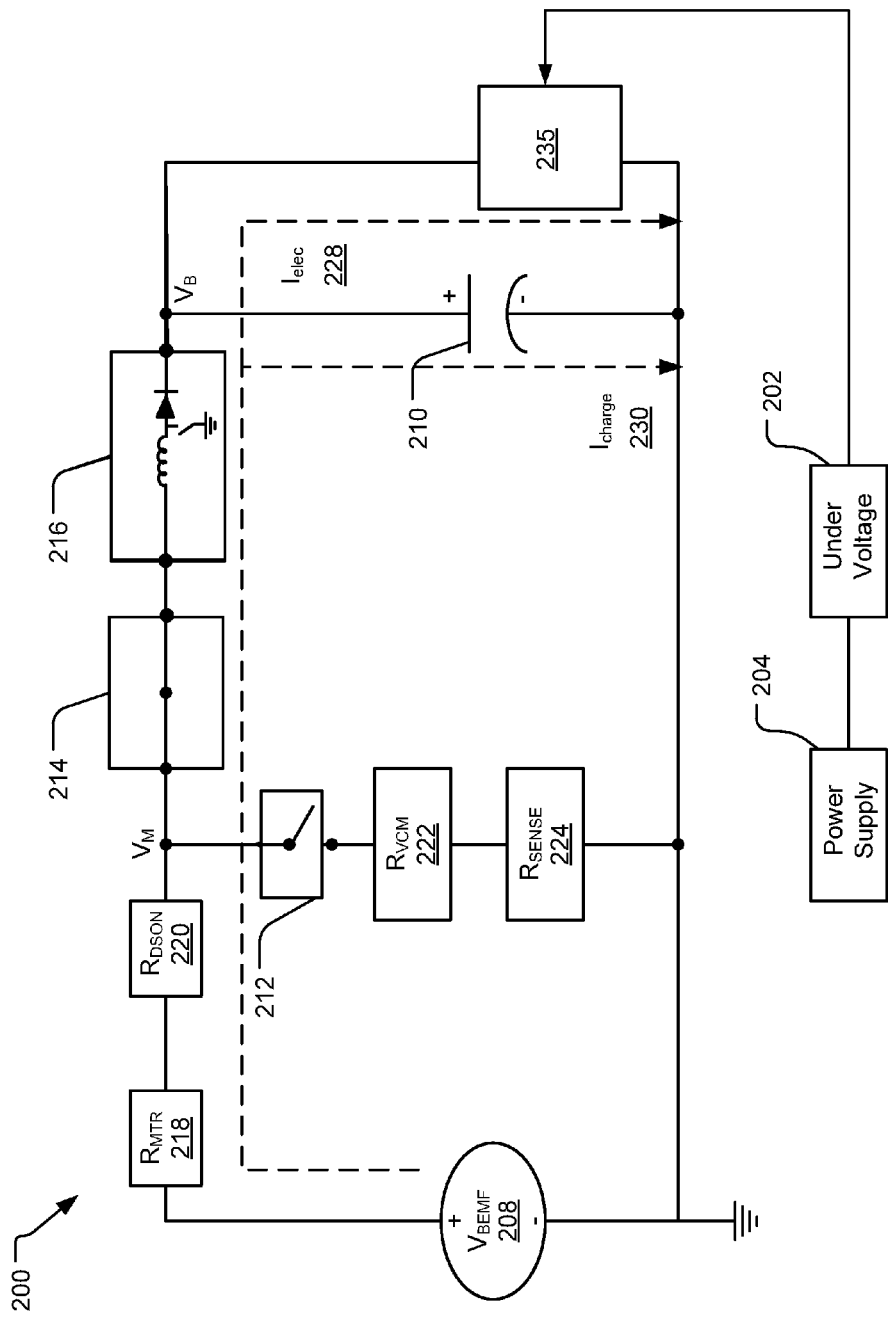
FIG. 2 illustrates example retract architecture in a tri-state.

FIG. 2 illustrates example retract architecture 200 in a data storage device during a VCM tri-state. The example retract architecture 200 includes an undervoltage detector 202 which detects when supply power is lost to the data storage device by continuously monitoring the state of a power supply 204. For purposes of this disclosure the power supply 204 is said to provide a supply power in terms of a voltage. When the undervoltage detector 202 detects that the power supply 204 is producing a voltage that has dropped below a predetermined voltage, it sends a signal indicating that a loss of supply power has occurred. This signal is received by a retract controller circuitry 235, which initiates a retract cycle on the actuator in order to move the head away from any data-containing surface of the disc and to a parked position.

There are two sources of available power remaining after loss of the supply power to the data storage device; the $V_{BEMF}$ 208 generated by the spindle motor as it winds down and a retract controller capacitor 210 capable of charging and discharging. Retract logic is operative on the circuitry of the retract controller circuitry 235, acting upon receipt of the loss of supply power signal from the undervoltage detector 202 to govern the setting of switch 214 to close and switch 212 to open, as shown during a VCM tri-state event in FIG. 2.

As depicted, $V_{BEMF}$ 208 supplies a current, which flows through the resistance of the spindle motor $R_{MTR}$ 218 and the resistance of the spindle motor driver $R_{DSON}$ 220. The motor's BEMF energy stops supplying current to the VCM (open switch 212), which supplies current to move a head to a parking ramp (depicted as a combination of VCM resistance $R_{VCM}$ 222 and sense circuit resistance $R_{SENSE}$ 224), when the switch 212 is closed. A $V_B$ charger logic regulator 216 charges the retract controller capacitor 210 (in a charging circuit $I_{charge}$ 330 circuit) at a $V_B$ during a VCM tri-state to provide the energy for later retract circuit use during the VCM driving state. The retract controller circuitry 235 has an associated resistance during the retract cycle. An electronics load utilized in a power circuit $I_{elec}$ 228 for retract controller circuitry 235 constantly consumes current consumption, regardless of whether the VCM is in tri-state or driving state. The disclosed technology directs the current towards the $V_B$ during a VCM tri-state and does not consume the current drawn by $V_B$ during a VCM driving state.

Figure 3:
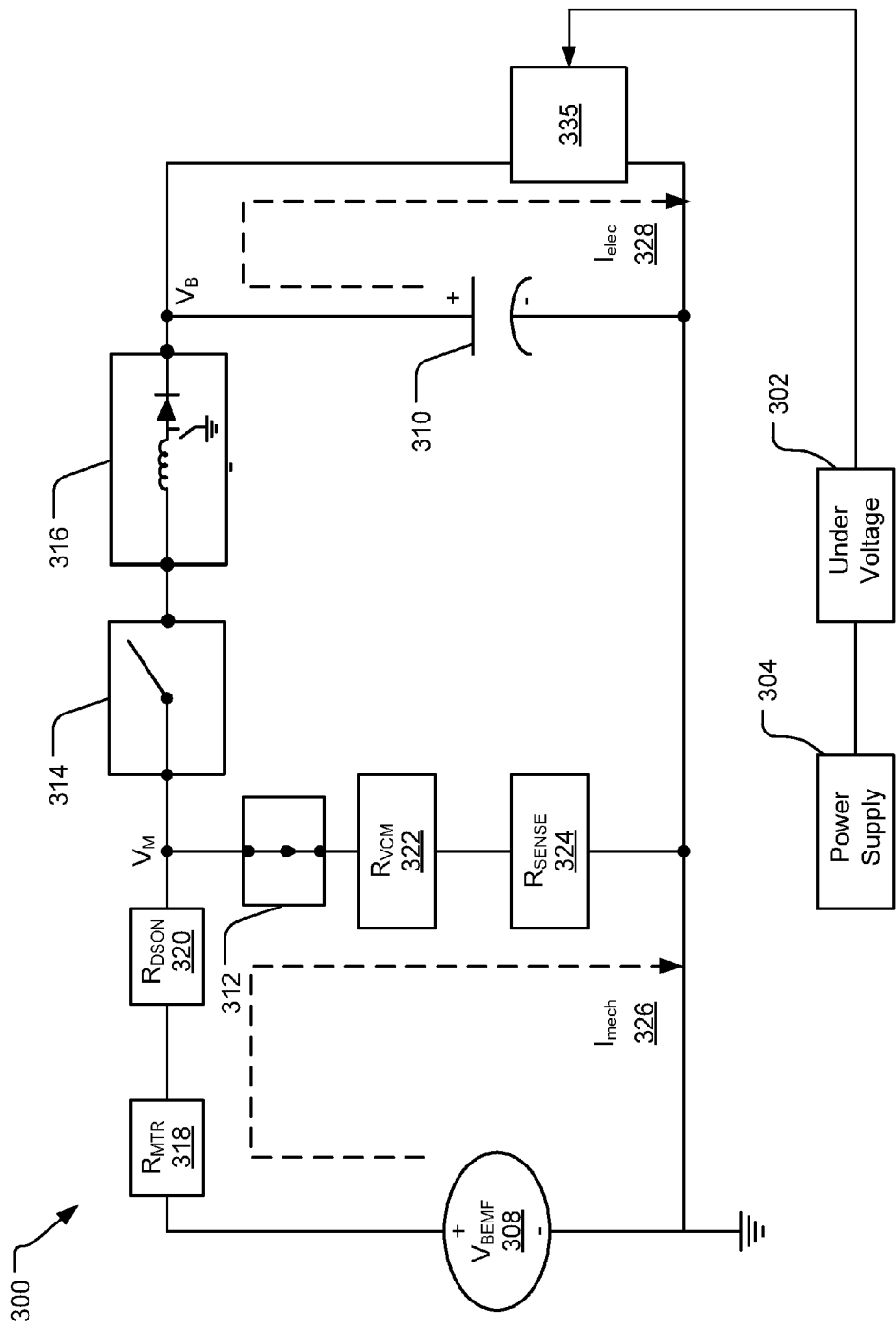
FIG. 3 illustrates example retract architecture in a driving state.

FIG. 3 illustrates example retract architecture 300 in a data storage device during a VCM driving state. Two power loads utilized during a power-loss retract event are depicted. The first power load is the mechanical load utilized in an actuator retract circuit $I_{mech}$ 326 to move a head to a parking ramp (depicted as a combination of VCM resistance $R_{VCM}$ 322 and sense circuit resistance $R_{SENSE}$ 324). An actuator is moved via a first motor (e.g., the VCM) in relation to a storage member (e.g., a data storage disc) that is moved by a second motor (e.g., a spindle motor $R_{MTR}$ 318). The second motor generates $V_{BEMF}$ 308.

The second power load depicted is an electronics load utilized in a power circuit $I_{elec}$ 328 for retract controller circuitry 335. The electronics load constantly consumes current consumption, regardless of whether the VCM is in tri-state or driving state. During a driving state, a $V_B$ charger logic regulator 316 will no longer boost the motor's $V_{BEMF}$ 308 to a higher voltage to provide the power for the retract controller circuitry 335 during the power loss event. The $V_B$ charging is disabled and the retract controller capacitor 310 will provide power for the retract controller circuitry 335.

Figure 4:
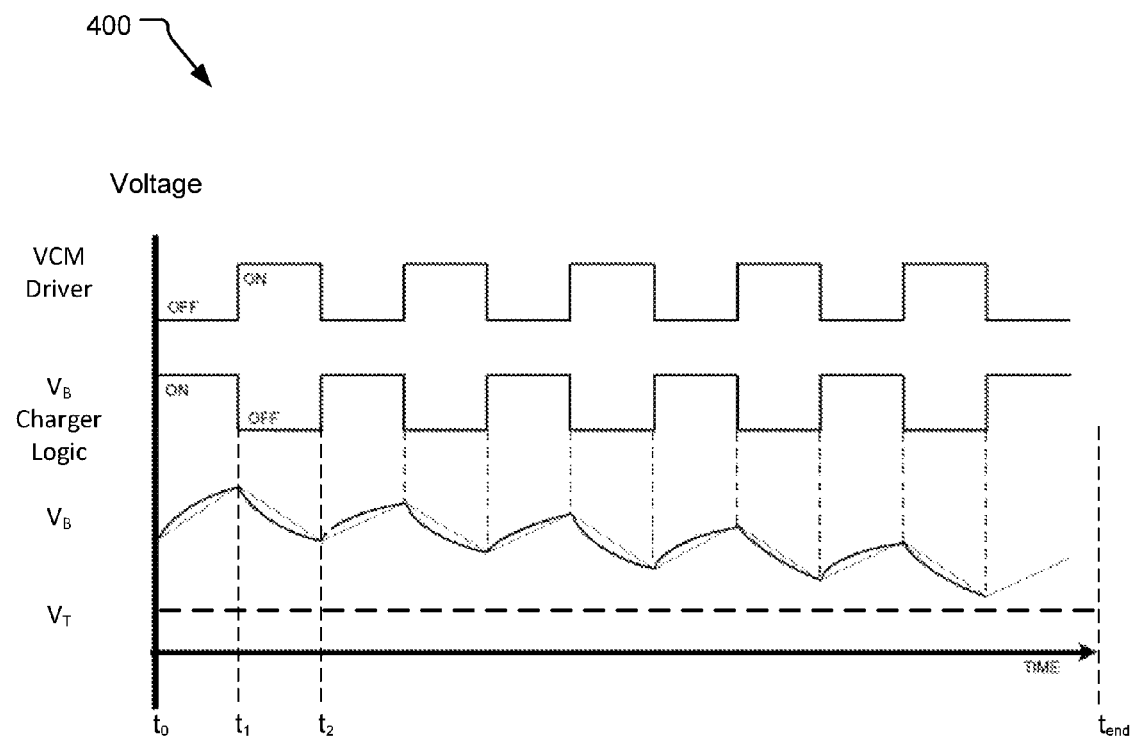
FIG. 4 is a graph that depicts an example embodiment of discontinuous boost voltage charging during actuator refraction.

FIG. 4 is a graph 400 that depicts the power relationships during the actuator retraction. During a tri-state (e.g., $t_0$ to $t_1$), the $V_B$ charger logic regulator charges a retract controller capacitor ($V_B$ Charger Logic ON), VCM Driver does not supply the BEMF energy to the VCM (VCM Driver OFF). During a driving state (e.g., $t_1$ to $t_2$), $V_B$ charging is disabled ($V_B$ Charger Logic OFF), the retract controller capacitor provides the power for the retract circuit. Further, the VCM driver is turned on to power movement of the actuator arm to the parking area (VCM Driver On).

For purposes of this description it will be understood that the data storage device senses a loss of supply power at time $t_0$. The $V_B$ decay curve intersects with the predetermined threshold target voltage $V_T$, advantageously affording a margin above that which is expected to be the power necessary to retract the actuator to the parking zone at time $t_{end}$. Excess $V_{BEMF}$ can be shed by braking the motor, either subsequent or simultaneous to parking.

Figure 5:
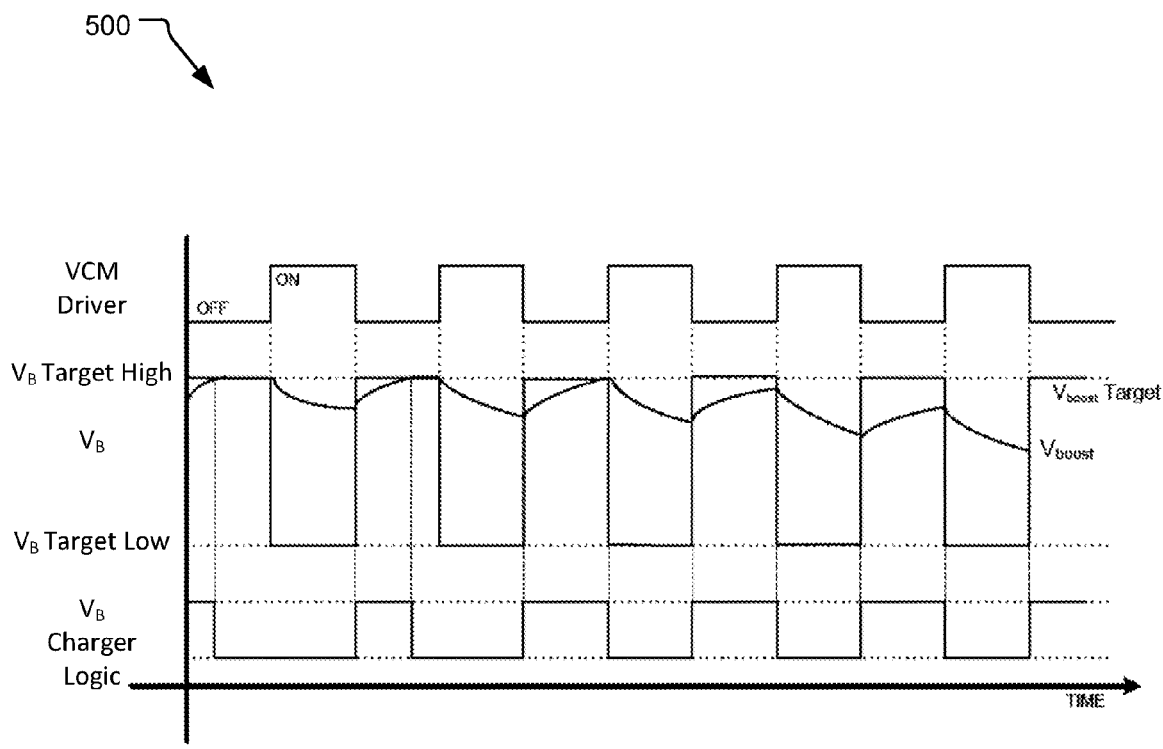
FIG. 5 is a graph that depicts another example embodiment of discontinuous boost voltage charging with target levels during actuator retraction.

FIG. 5 is a graph 500 that depicts another embodiment of the charging during the actuator retraction. Threshold determination of charging may be based on time and two voltage level targets for $V_B$ voltage, defined for VCM driving state ($V_B$ low) and a tri-state ($V_B$ high). The $V_B$ level target for VCM driving state may be lower than that for a VCM tri-state but is higher than the minimal voltage requirement for retract circuit alive. The $V_B$ charger logic turns on the $V_B$ charger logic regulator to charge the retract controller capacitor if the $V_B$ is lower than the current $V_B$ level target. In order to avoid the $V_B$ charging or minimize the charging during a VCM driving state, the chosen capacitor value should be large enough to maintain the $V_B$ voltage above the $V_B$ low target level during a VCM driving state.

In yet another embodiment, a $V_B$ charger logic may partially charge the retract controller capacitor during a VCM driving state at a lower charging frequency than a VCM tri-state to minimize the current drawn by $V_B$ and maximize the VCM current driving capability during a VCM driving state. The partial charging during a VCM driving state can reduce the voltage variation in each duty cycle.

Figure 6:
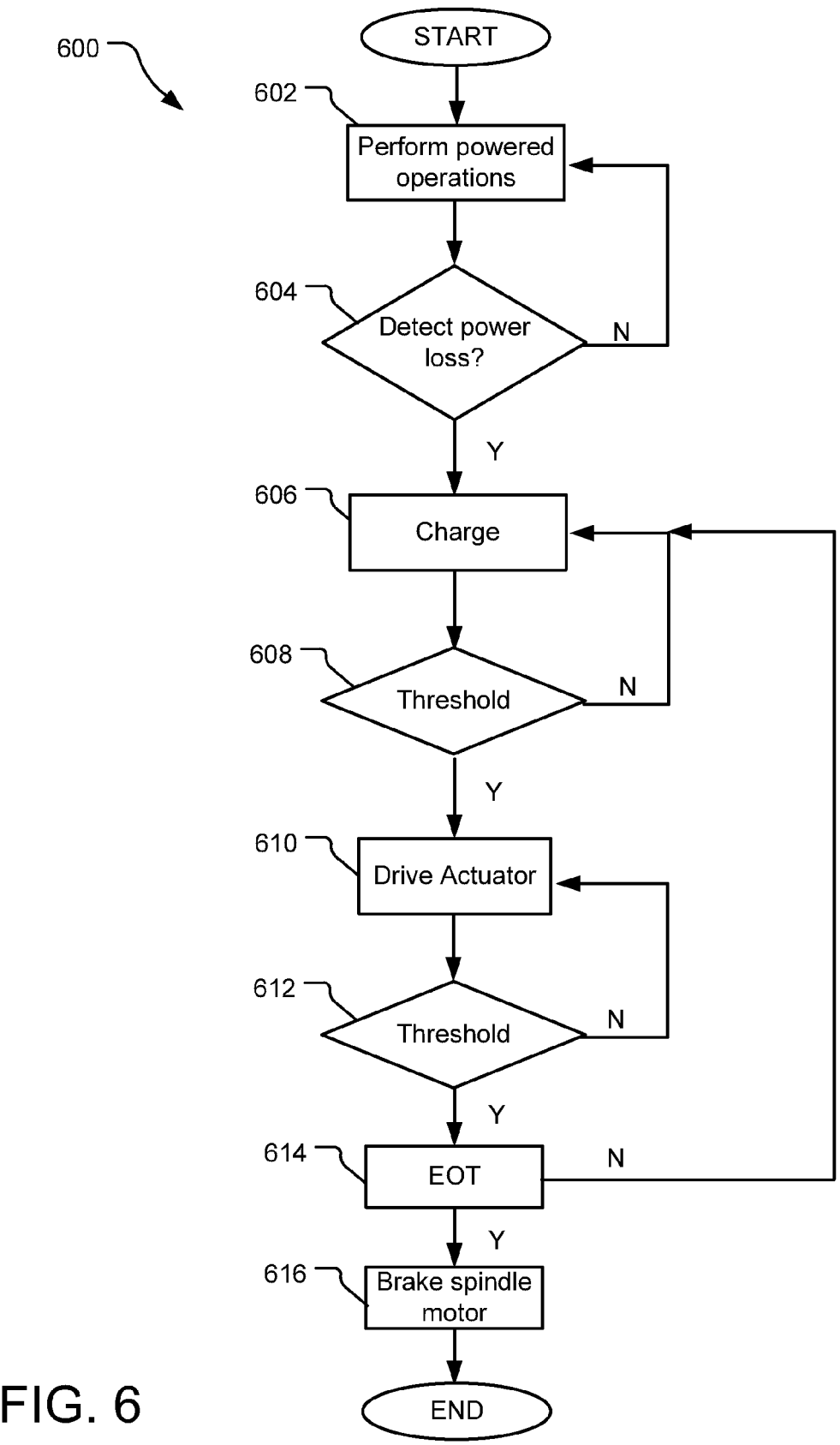
FIG. 6 illustrates example operations for retracting an actuator.

FIG. 6 illustrates example operations 600 for retracting an actuator. A powered operation 602 performs within the normal operational mode of the data storage device, before any indication that any loss of supply power has occurred. In this normal operation mode, a switch (see, e.g., the switch 214 in FIG. 2) may be closed so that the $V_{BEMF}$ charges a capacitive element. A decision operation 604 determines whether a power loss event has occurred, such as described by function of an undervoltage detector. If the determination of the decision operation 604 is "no," then powered operations 602 continue and the data storage device continues to function in the normal (e.g., powered) operation mode. Operations 602 and 604 repeat iteratively as the data storage device is monitored for an unexpected power loss.

If, however, the determination of the decision operation 604 is "yes," then a $V_B$ charger logic will utilize a VCM tri-state to charge a retract controller capacitor $V_B$ in a charging operation 606. A threshold determination operation 608 determines whether a designated parameter has been obtained. For example, as discussed above, parameterization of retract voltage and time durations may be performed to optimize the retract cycle. The retract controller capacitor capacitor will continue to charge until the determination threshold determination operation 608 is "yes," then $V_B$ charging is disabled during a VCM driving state, and the retract controller capacitor for the $V_B$ provides the power for the retract circuit to drive the actuator in a driving operation 610. A threshold determination operation 612 determines whether a second designated parameter has been obtained for a driving state (e.g., voltage or time threshold).

During an end of travel (EOT) operation 614, a determination is made whether the head's end of travel (EOT) has been reached. For example, without limitation, in the illustrative embodiments described herein, the EOT is when the head is secured in the parking zone of the ramp. More particularly, the EOT can be defined in terms of when the tab slidingly traverses an inclined surface of a ramp to slidingly engage a parking zone surface.

Once the threshold has been obtained, then the spindle motor can be braked in a braking operation 616 as desired to hasten the wind-down of rotation. Any additional $V_B$ and/or $V_{BEMF}$ can be used to engage the actuator against a positive stop member (not depicted) and/or to actuate a latch (not depicted) to retain it in the parked position, and the operation ends.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

It is to be understood that even though numerous characteristics and advantages of various embodiments of the present invention have been set forth in the foregoing description, together with the details of the structure and function of various embodiments of the invention, this disclosure is by way of example only, not by limitation. The post loss of supply power retract concepts herein are not limited to use or application with any specific system or method that employs the components as specifically arranged in the illustrative embodiments of the disclosure. That is, although the instrumentalities described herein are for the convenience of explanation, shown and described with respect to exemplary embodiments, it will be appreciated that the principles herein may be applied equally in other types of systems and methods.

For example, without limitation, the backup power source can be something other than a capacitor, such as a battery or other energy cell in alternative equivalent embodiments. Additionally, other motor and power cell components and various arrangements thereof than the VCM and capacitor described are contemplated while still maintaining substantially the same functionality without departing from the scope and spirit of the claimed invention. Further, although the illustrative embodiments described herein are directed to data storage devices, and related technology, it will be appreciated that the claimed invention can be applied to other devices employing retract controller circuitry responsive to a loss of supply power as well without departing from the spirit and scope of the present invention. The implementations described above and other implementations are within the scope of the following claims.

What is claimed is:

1. A method comprising:
    charging a retract controller capacitor using a back electromagnetic force voltage, wherein the retract controller capacitor is partially charged during a voice coil motor driving state at a lower charging frequency than a voice coil motor tri-state;
    discharging the charged retract controller capacitor to power a retract controller; and
    driving an actuator arm toward a desired location within a storage drive concurrently with the discharging operation.

2. The method of claim 1, wherein charging the retract controller capacitor occurs during a voice coil motor tri-state.

3. The method of claim 1, wherein discharging the retract controller capacitor occurs during a voice coil motor driving state.

4. The method of claim 1, wherein a first threshold determination operation determines when charging is disabled and a second threshold determination operation determines when the actuator arm has reached an end of travel.

5. The method of claim 1, wherein two voltage level targets for a backup power source voltage ($V_B$) are defined for the voice coil motor driving state and the voice coil motor tri-state, the target $V_B$ level for the voice coil motor driving state is lower than that for the voice coil motor tri-state but is higher than a minimal voltage requirement for retract circuit alive, and a $V_B$ charger logic turns on a $V_B$ charger logic regulator to charge the retract controller capacitor if the $V_B$ is lower than the target $V_B$ level.

6. A system for powering retract cycle operations during a loss of supply power, comprising:
    a charging circuit, that charges a retract controller capacitor;
    a power circuit, that discharges the charged retract controller circuit to power a retract controller; and
    an actuator retract circuit that moves an actuator arm to a desired location concurrently with the power circuit discharging the charged retract controller capacitor to power the retract controller, wherein a first threshold determination operation determines when charging is disabled and a second threshold determination operation determines when the actuator arm has reached an end of travel.

7. The system of claim 6, wherein charging the retract controller capacitor occurs during a voice coil motor tri-state.

8. The system of claim 6, wherein discharging the retract controller capacitor occurs during a voice coil motor driving state.

9. The system of claim 6, wherein the retract controller capacitor is partially charged during a voice coil motor driving state at a lower charging frequency than voice coil motor tri-state.

10. The system of claim 6, wherein two voltage level targets for a backup power source voltage ($V_B$) are defined for a voice coil motor driving state and a voice coil motor tri-state, the $V_B$ level target for the voice coil motor driving state is lower than that for the voice coil motor tri-state but is higher than the minimal voltage requirement for retract circuit alive, and the $V_B$ charger logic turns on a $V_B$ charger logic regulator to charge the retract controller capacitor if the $V_B$ is lower than a $V_B$ level target.

11. The system of claim 6, wherein the retract controller capacitor is partially charged during the voice coil motor driving state at a lower charging frequency than the voice coil motor tri-state.

12. One or more computer readable storage media storing computer-executable instructions in memory and executable to perform a computer process, the computer process comprising:
    charging a retract controller capacitor using a back electromagnetic force voltage;
    discharging the charged retract controller capacitor to power a retract controller; and
    driving an actuator arm toward a desired location within a storage drive concurrently with the discharging operation, wherein two voltage level targets for a backup power source voltage ($V_B$) are defined for a voice coil motor driving state and a voice coil motor tri-state, the $V_B$ level target for the voice coil motor driving state is lower than that for the voice coil motor tri-state but is higher than the minimal voltage requirement for retract circuit alive, and the $V_B$ charger logic turns on $V_B$ charger logic regulator to charge the retract controller capacitor if the $V_B$ is lower than a $V_B$ level target.

13. The computer readable storage media of claim 12, wherein charging the retract controller capacitor occurs during the voice coil motor tri-state.

14. The computer readable storage media of claim 12, wherein discharging the retract controller capacitor occurs during the voice coil motor driving state.

15. The computer readable storage media of claim 12, wherein the retract controller capacitor is partially charged during the voice coil motor driving state at a lower charging frequency than voice coil motor tri-state.

16. The method of claim 1, further comprising determining whether a first designated parameter has been obtained to meet a first threshold for the voice coil motor tri-state.

17. The method of claim 16, further comprising discharging the charged retract controller capacitor when the first threshold is met.

18. The method of claim 16, wherein the first designated parameter is retract voltage.

19. The method of claim 16, wherein the first designated parameter is time duration.

20. The method of claim 16, further comprising determining whether a second designated parameter has been obtained to meet a second threshold during the voice coil motor driving state.

* * * * *